US008544092B2

(12) United States Patent
Hermann et al.

(10) Patent No.: US 8,544,092 B2
(45) Date of Patent: Sep. 24, 2013

(54) INTEGRITY VERIFICATION USING A PERIPHERAL DEVICE

(75) Inventors: Reto Hermann, Buttikon (CH); Klaus Julisch, Bonstetten (CH); Matthias Schunter, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 12/402,777

(22) Filed: Mar. 12, 2009

(65) Prior Publication Data

US 2010/0235912 A1  Sep. 16, 2010

(51) Int. Cl.
*G06F 12/14* (2006.01)
(52) U.S. Cl.
USPC .......... 726/23; 726/22; 726/24; 726/25; 713/187; 713/194
(58) Field of Classification Search
None
See application file for complete search history.

(56) References Cited

U.S. PATENT DOCUMENTS

| | | | |
|---|---|---|---|
| 8,176,336 B1 * | 5/2012 | Mao et al. | 713/189 |
| 2005/0073423 A1 * | 4/2005 | Kim | 340/686.1 |
| 2006/0026423 A1 * | 2/2006 | Bangerter et al. | 713/164 |
| 2006/0282680 A1 * | 12/2006 | Kuhlman et al. | 713/186 |
| 2007/0101138 A1 * | 5/2007 | Camenisch | 713/168 |
| 2007/0112981 A1 * | 5/2007 | Hernandez | 710/62 |
| 2007/0143629 A1 * | 6/2007 | Hardjono et al. | 713/189 |
| 2007/0204166 A1 * | 8/2007 | Tome et al. | 713/182 |
| 2007/0280509 A1 * | 12/2007 | Owen et al. | 382/115 |
| 2007/0300031 A1 * | 12/2007 | Jevans et al. | 711/166 |
| 2008/0028146 A1 * | 1/2008 | Dan et al. | 711/115 |
| 2008/0066168 A1 * | 3/2008 | Gregg et al. | 726/7 |
| 2008/0320308 A1 * | 12/2008 | Kostiainen et al. | 713/171 |
| 2009/0007104 A1 * | 1/2009 | Zimmer et al. | 718/1 |
| 2009/0013192 A1 * | 1/2009 | Chen et al. | 713/189 |
| 2009/0049510 A1 * | 2/2009 | Zhang et al. | 726/1 |
| 2009/0067688 A1 * | 3/2009 | Boshra et al. | 382/124 |
| 2009/0132816 A1 * | 5/2009 | Lee | 713/164 |

OTHER PUBLICATIONS

Baentsch, Michael et al.. The Zurich Trusted Information Channel—An Efficient Defence Against Man-in-the-Middle and Malicious Software Attacks. Lecture Notes in Computer Science. 2008. 75-91. vol. 4968. Springer Berlin/ Heidelberg. Germany.
Baentsch, Michael et al.. [online]; [retrieved Apr. 2008]; retrieved from the Internet http://ercim-news.ercim.org/content/view/345/543/.

* cited by examiner

*Primary Examiner* — Jung Kim
*Assistant Examiner* — Adrian Stoica
(74) *Attorney, Agent, or Firm* — Thomas A. Beck; Daniel P. Morris

(57) ABSTRACT

A peripheral device includes an interface configured to communicate with a computer, the peripheral device; logic configured to perform an integrity verification of an operating system of the computer; and a display configured to display a result of the integrity verification. A method for integrity verification of a computer using a peripheral device includes connecting the peripheral device to the computer; sending a challenge from the device to the computer; computing attestation data using the challenge and information stored in the computer, retrieving the attestation data from the computer by a client program running on the computer; sending the attestation data to the peripheral device; and verifying the attestation data by the peripheral device.

9 Claims, 5 Drawing Sheets

300

```
COMPUTER COMMENCES BOOT OF OPERATING SYSTEM
301
```

```
OPERATING SYSTEM RECORDS MEASUREMENT IN TPM
302
```

```
USB PERIPHERAL DEVICE CONNECTS TO COMPUTER
303
```

```
CLIENT PROGRAM IS LAUNCHED ON COMPUTER
304
```

```
VERIFICATION OF DATA IN TPM IS PERFORMED BY USB PERIPHERAL DEVICE
305
```

```
DISPLAY RESULT OF VERIFICATION
306
```

INTEGRITY VERIFICATION USING A
PERIPHERAL DEVICE

BACKGROUND

This disclosure relates generally to the field of computer integrity verification.

Root kits, Trojan horses, or other types of malicious code may compromise the operating system of a computer, thereby compromising the trustworthiness of all code running on the computer. To determine if a computer has been compromised, it is relevant to determine if the computer is booted with a verifiably sound and trustworthy operating system. Trusted Platform Module (TPM), technology (see https://www.trustedcomputinggroup.org/groups/tpm/ for more information on TPM) may be used for trust verification of a computer. TPM provides a secure hardware location on a computer that stores a measurement of all software that is executed by the computer during the boot process; the measurement may be used for integrity verification.

TPM is included in many computer platforms, including many brands of personal computers. A TPM enables integrity validation of code when the computer boots by performing hardware-protected measurement and attestation to a stored log. In hardware-protected measurement, the computer generates and securely stores a cryptographic hash value of all code involved in the boot process in the secure TPM storage. The computer then generates a log entry for the cryptographic hash value, and securely stores the log entry in the TPM. Attestation to the stored log occurs when, in response to a randomly generated challenge from an outside piece of hardware, the computer produces a signature from a log entry in the TPM that allows the outside piece of hardware to verify the log entry by comparing the log entry to hashes of known, trusted code. At computer startup, code on the computer, including but not limited to the basic input/output system (BIOS), the bootloader, the kernel, and any applications, is first loaded into memory, then measured, and then executed. The measurement of the code is stored in a log in the TPM. A piece of malicious code is unable to erase its associated log entry, as the log entry is stored in the secure TPM before the execution of the code starts.

To complete attestation, the TPM requires a separate, trusted host, known as a verifier, to issue a challenge and perform attestation, thereby determining if a given computer is booted with a trusted operating system. An owner of a personal computer may not have a separate host that may act as verifier. The benefits of TPM verification are not available to users that do not have a separate verifier computer.

BRIEF SUMMARY

An exemplary embodiment of a peripheral device includes an interface configured to communicate with a computer, the peripheral device; logic configured to perform an integrity verification of an operating system of the computer; and a display configured to display a result of the integrity verification.

An exemplary embodiment of a method for integrity verification of a computer using a peripheral device includes connecting the peripheral device to the computer; sending a challenge from the device to the computer; computing attestation data using the challenge and information stored in the computer, retrieving the attestation data from the computer by a client program running on the computer; sending the attestation data to the peripheral device; and verifying the attestation data by the peripheral device.

An exemplary embodiment of a system for verifying the integrity of a computer using a peripheral device includes a computer, the computer comprising an operating system; and a peripheral device in communication with the computer, the peripheral device being configured to perform an integrity verification of the operating system.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for integrity verification using a peripheral device are provided, with exemplary embodiments being discussed below in detail.

A TPM on a computer may communicate with a relatively small, cheap type of hardware, including but not limited to a universal serial bus (USB, see http://www.usb.org for general information on USB) peripheral device, to verify the integrity of the computer. The peripheral device may run the TPM verification protocol and display a result of the verification on, for example, an embedded display, by using lights, or by other appropriate means.

Embodiments of a USB device may be small in size, and in some embodiments the shape of the USB device may be akin to a key fob. The functionality provided by USB devices varies widely. USB devices may include but are not limited to USB flash memory devices, network devices such as wireless network adapters for 802.11 WLAN or Bluetooth, keyboards, mice, webcams, cryptographic tokens, and DVB-T adapters for TV and radio reception.

A USB device comprises a communication interface, or interconnect, conforming to the USB standard. The USB communication interface comprises a serial bus system designed to allow many different types of USB peripherals to be connected to a computer using a single standardized interface socket, providing plug-and-play capability. A system comprising a USB device may be divided into three parts: the USB host (for example, a computer to which the USB device is connected), the USB device, and the USB interconnect. There are various versions of the USB standard available. USB 1.1 supports two speeds, low speed at 1.5 Mbits/s, and full speed at 12 Mbits/s. USB 2.0 supports higher speeds at 480 Mbits/s. Faster versions of USB are in development, as is wireless USB. Embodiments of a peripheral device used for integrity verification may incorporate any appropriate version of USB technology.

A USB device may require a specialized device driver in order to communicate with the operating system of a computer, or the USB device may conform to a standardized device class, for which an operating system may provide a standard device drivers. Device classes are defined for a wide range of USB peripheral devices such as hub devices, mass storage devices such as memory sticks, or human interface devices such as computer keyboards and mice, network interface devices, and many more.

Figure 1:
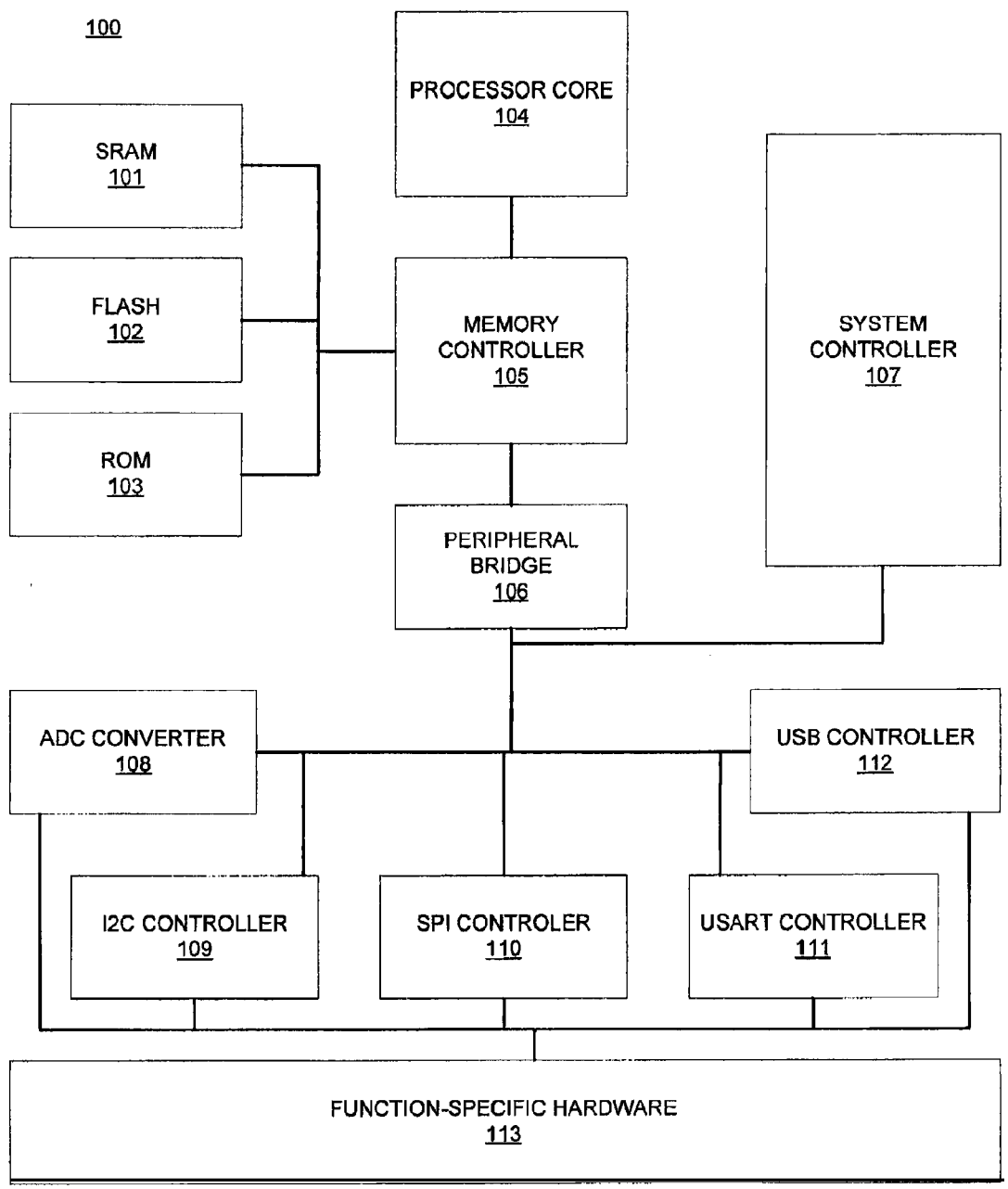
FIG. 1 illustrates an embodiment of a peripheral device that may be used for integrity verification.

FIG. 1 illustrates an embodiment of a peripheral device 100 that may be used as a peripheral device for integrity verification. Peripheral device 100 is an embedded system comprising a microprocessor core 104, memory controller 105, static RAM 101, flash memory 102, ROM 103, system controller 107, which may comprise an interrupt controller, timers, and power management. Communications controllers in the peripheral device 100 may include USART controller 111, SPI controller 110, I2C controller 109, and USB communications controller 112. The various components that comprise peripheral device 100 may be provided by a single system-on-chip (SOC) device, by an application specific integrated circuit (ASIC) chip, or by several commercial off the shelf (COTS) components in some embodiments. Depending on the functionality of peripheral device 100, function-specific hardware 113 complements the system. Function-specific hardware 113 may include but is not limited to a display device. Peripheral device 100 may act as a general purpose embedded computing device with a USB client interface. Software loaded on peripheral device 100 may determine the functionality of the device.

Figure 2:
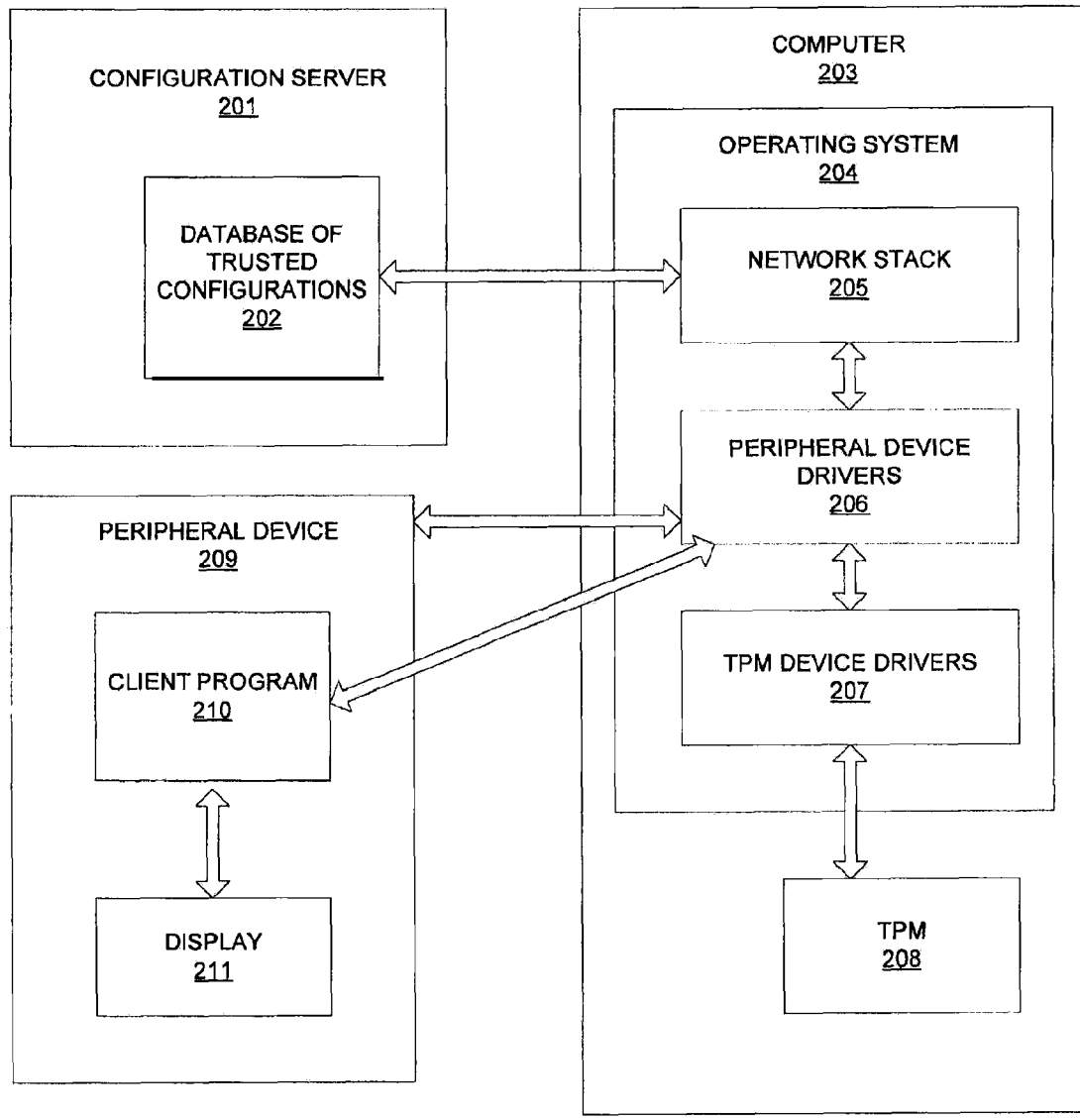
FIG. 2 illustrates an embodiment of a system incorporating a peripheral device for integrity verification.

FIG. 2 illustrates an embodiment of a computer system 200 comprising a peripheral device for verification. Computer 203 comprises operating system 204, which in turn supports network stack 205, peripheral device drivers 206, and TPM device drivers 207. Network stack 205 communicates with a database of trusted configurations 202 on configuration server 201 via a network connection, and with peripheral device drivers 206. Peripheral device drivers 206 communicate with client program 210 on peripheral device 209 via an interface. Client program 210 may communicate with display 211 on peripheral device 209. TPM device drivers 207 communicate with TPM 208 on computer 203. In some embodiments, peripheral device 209 may be a read-only USB device.

Figure 3:
FIG. 3 illustrates an embodiment of a method for integrity verification using a USB peripheral device.
Figure 3:
Figure 3:
Figure 3:
Figure 3:

FIG. 3 illustrates an embodiment of a method 300 for integrity verification using a peripheral device, which is discussed with reference to FIG. 2. In block 301, computer 203 commences the boot process, booting operating system 204, including network stack 204, peripheral device drivers 206, and TPM device deriver 207. In block 302, operating system 204 records attestation data and log information for the booted software in TPM 208 via TPM device drivers 207. In block 303, peripheral device 209 connects to the computer. Communication with peripheral device 209 may require the operating system 204 to possess a driver suitable for communicating with the device class of peripheral device 209.

In block 304, client program 210 is launched; the client program 210 may be loaded from peripheral device 209 and launched on computer 203, or, alternatively, the client program 210 may be pre-installed on computer 203. In block 305, integrity verification of the attestation data stored in TPM 208 is performed by the peripheral device; integrity verification is discussed in further detail below with regard to FIG. 4. Lastly, in block 306, peripheral device 209 signals via display 211 the result of the verification. In some embodiments, the display 211 may display the words "OK" or "FAIL" to signal that the verification was successful or unsuccessful, or the display 211 may show a green light to indicate successful verification, and a red light to signal unsuccessful verification.

Figure 4:
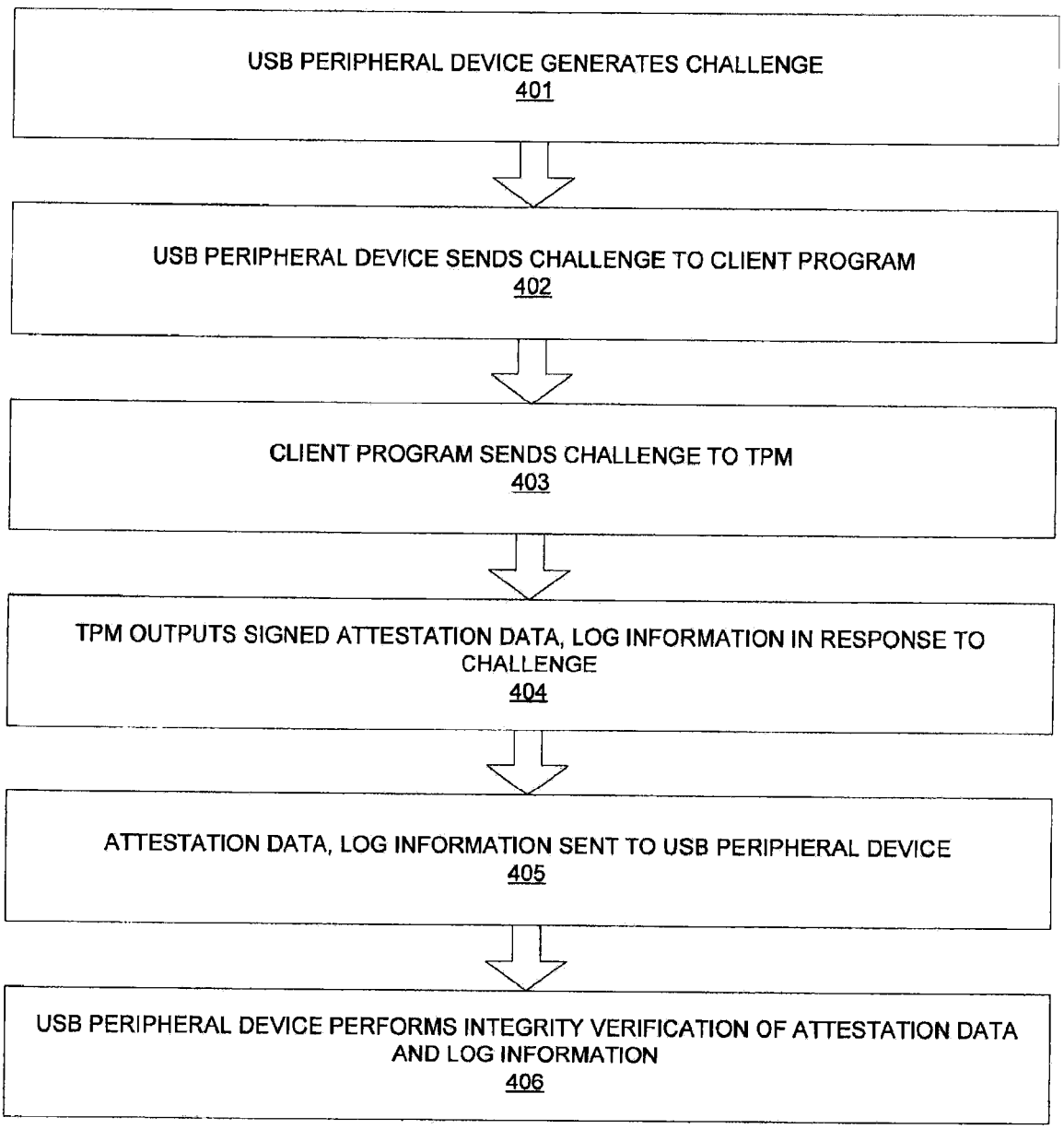
FIG. 4 illustrates a method of integrity verification.

FIG. 4 illustrates an embodiment of a method 400 for integrity verification. In block 401, peripheral device 209 generates a random challenge. In block 402, the random challenge is sent to client program 210. In block 403, client program 210 sends the challenge to TPM 208 via TPM device drivers 207. In block 404, TPM 208 outputs signed attestation data and log information to client program 210 in response to the challenge. In block 405, client program 210 sends the attestation data and the log information to peripheral device 209 to be verified. In block 406, the attestation data and log information are verified by peripheral device 209. Verification of the attestation data and log information by peripheral device 209 may be performed in various ways. The peripheral device 209 may compare the attestation and log information received from the TPM 208 on computer 203 to a known list of acceptable attestation values. Client program 210 may also compile a list of certificates that enable the peripheral device 209 to verify the attestation data from the log data, or the client program may obtain a correctness certificate from a database of trusted configurations 202 via a network connection.

To verify the attestation data, peripheral device 209 requires access to a list of acceptable attestation values. Peripheral device 209 may also require any information necessary for verification of a certificate, such as keys used to generate any third-party certificates. In some embodiments, peripheral device 209 is preconfigured with this information. In an alternative embodiment, peripheral device 209 may download this information from a configuration server 201. To download a key, peripheral device 209 may establish a connection, including but not limited to a secure socket layer (SSL) connection, to configuration server 201 via peripheral device drivers 206 and network stack 205 to download the public key. Such downloads may be performed upon request from a user, or performed automatically each time peripheral device 209 is used. If peripheral device 209 is offline, or cannot download the latest key information for some other reason, peripheral device 209 may use the most recent information obtained from configuration server 201.

In some embodiments, the functionality of peripheral device 209 may be integrated into a keyboard or other piece of peripheral hardware. In some embodiments, peripheral device 209 may possess additional functionality, including but not limited to fingerprint reading or data storage. If the TPM verification process is successful, peripheral device 209 may enable the additional functionality. A peripheral device 209 comprising an external fingerprint reader may verify the integrity of computer 203 before sending a scanned fingerprint to the computer. In this manner, it may be ensured that scanned fingerprints are only sent to a trusted computer.

Figure 5:
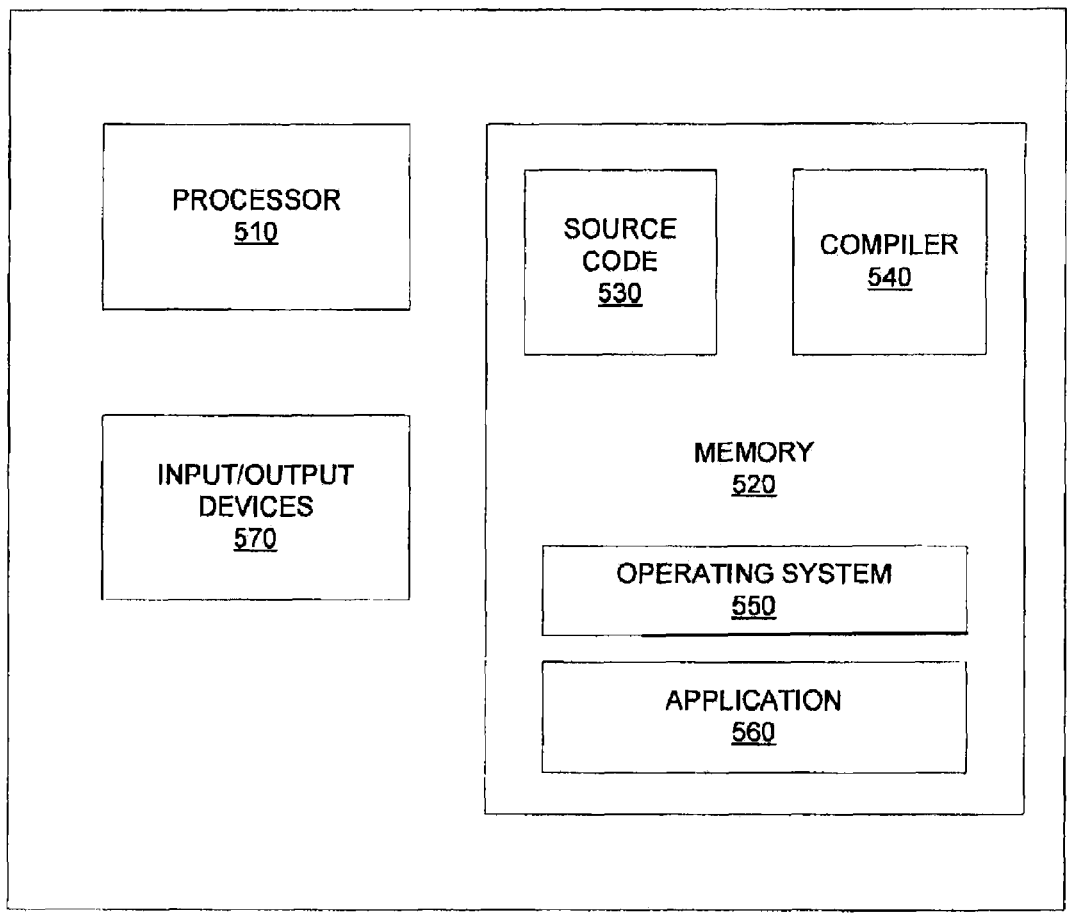
FIG. 5 illustrates an embodiment of a computer that may be used in conjunction with systems and methods for integrity verification using a peripheral device.

FIG. 5 illustrates an example of a computer 500 having capabilities, which may be utilized by exemplary embodiments of systems and methods for integrity verification using a peripheral device as embodied in software. Various operations discussed above may utilize the capabilities of the computer 500. One or more of the capabilities of the computer 500 may be incorporated in any element, module, application, and/or component discussed herein.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. Application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the OS 550. Furthermore, the application 560 can be written as any type of available programming language, including but not limited to an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the OS 550 are read, in whole or in part, by the processor 510, perhaps buffered within the processor 510, and then executed.

When the application 560 is implemented in software it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical medium (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include the ability to verify that the operating system of a computer has not been compromised without a separate full-fledged and generally expensive machine to act as the verifier, allowing for increased security.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A peripheral device, comprising:
    an interface configured to communicate with a computer, wherein said interface comprises a USB (universal serial bus) interface, and said peripheral device comprises a USB peripheral device,
    said peripheral device being an embedded system comprising a microprocessor core, memory controller, static RAM, flash memory, ROM, system controller, said system controller having an interrupt, at least one timer, and power management components, and
    said peripheral device further including communications controllers comprising USART controller, SPI controller, I2C controller and USB communications controller; components that comprise said peripheral device are selected from the group consisting of: a single system on chip (SOC) device, an application specific integrated circuit chip (ASIC), and commercial off the shelf (COTS) components;
    function specific display device hardware;
    logic configured to perform an integrity verification of an operating system of the computer, wherein the integrity verification comprises:
    issuing a random challenge by said peripheral device;
    sending said random challenge from said peripheral device to a trusted platform module (TPM) on a computer;
    receiving attestation data and log information regarding a boot process of said computer from the TPM by said peripheral device in response to said random challenge;
    using said peripheral device, verifying said attestation data and said log information by comparing said attestation data and said log information received from said TPM on said computer to verification information comprising a known list of acceptable attestation values, said verification information received by said peripheral device from a configuration server via a network, wherein
    said logic further comprises a client program configured to execute on said computer,
    said client program further configured to load from said peripheral device onto said computer and to receive said verification information via a network connection of said computer that is connected to said network, wherein said verification information comprises a plurality of certificates;
    a display, said display being located on said peripheral device, configured to display a result of the comparison of the attestation data from the computer with the verification information received by said peripheral device from said configuration server; and
    an external fingerprint reader, said external fingerprint reader configured to send a scanned fingerprint to said computer based on a successful integrity verification.

2. The peripheral device of claim 1, wherein the peripheral device is a read-only device.

3. The peripheral device of claim 1, wherein the peripheral device comprises one of a keyboard, a mouse, or a network device.

4. A method for integrity verification of a computer using a peripheral device, the method comprising:
    connecting said peripheral device, said peripheral device comprising an embedded system comprising a microprocessor core, memory controller, static RAM, flash memory, ROM, system controller, said system controller having an interrupt, at least one timer, and power management components, and said peripheral device further including communications controllers comprising USART controller, SPI controller, I2C controller and USB communications controller;
    components that comprise said peripheral device are selected from the group consisting of a single system on chip (SOC) device, an application specific integrated circuit chip (ASIC) and commercial off the shelf (COTS) components and a universal serial bus (USB) device comprising a display, to the computer;
    sending a random challenge from said peripheral device to said computer;
    computing attestation data using said random challenge and information stored in said computer, wherein said attestation data is computed using information from a trusted platform module on said computer;
    retrieving said attestation data and said log information regarding a boot process of said computer from said computer by a client program running on said computer, wherein said client program is configured to load from said peripheral device onto said computer;
    sending said attestation data and said log information from said computer to said peripheral device;
    using said peripheral device to verify said attestation data by comparing said attestation data and log information received from said TPM to verification information received from said client program, wherein said verification information is received by said client program from a configuration server via a network connection of said computer that is connected to said network, wherein said verification information comprises a plurality of certificates;

displaying a result of said comparison of said attestation data from said computer with said verification information received by said peripheral device from the configuration server on the display on said peripheral device;

and wherein said peripheral device further comprises a fingerprint scanner, and the method further comprising sending a scanned fingerprint to said computer based on a successful integrity verification.

5. The method of claim 4, wherein the peripheral device is a read-only device.

6. The method of claim 4, wherein the peripheral device comprises one of a keyboard, a mouse, or a network device.

7. A system comprising:

a computer, said computer comprising an operating system and a trusted platform module (TPM), said TPM configured to store attestation data regarding said operating system; and a peripheral device in communication with said computer, the peripheral device being configured to perform an integrity verification of the operating system, said peripheral device being an embedded system comprising a microprocessor core, memory controller, static RAM, flash memory, ROM, system controller, said system controller having an interrupt, at least one timer, and power management components, and said peripheral device further including communications controllers comprising USART controller, SPI controller, I2C controller and USB communications controller; components that comprise said peripheral device are selected from the group consisting of a single system on chip (SOC) device, an application specific integrated circuit chip (ASIC) and commercial off the shelf (COTS) components; function specific display device hardware; an interface configured to communicate with said computer, wherein said interface comprises a USB (universal serial bus) interface, and said peripheral device comprises a USB peripheral device;

a logic element comprising a client program configured to execute on said computer, said client program further configured to load from said peripheral device onto said computer and to receive verification information via a network connection of said computer that is connected to said network, wherein said verification information comprises a plurality of certificates; and said logic element further configured to perform an integrity verification of an operating system of said computer, wherein said integrity verification comprises:

issuing a random challenge by said peripheral device;

sending said random challenge from said peripheral device to a trusted platform module (TPM) on said computer;

receiving attestation data and log information regarding a boot process of said computer from said TPM by said peripheral device in response to said random challenge;

verifying said attestation data using a verification method selected from the group consisting of: comparing said attestation data and said log information received from said TPM on said computer to a known list of acceptable attestation values; using a client program to compile a list of certificates that enable said peripheral device to verify said attestation data; and using said client program to obtain a correctness certificate from a database of trusted configurations via a network connection;

a display, said display being located on said peripheral device, configured to display a result of said comparison of said attestation data from said computer with said verification information received by said peripheral device from said configuration server; and a fingerprint scanner located on said peripheral device configured to send a scanned fingerprint to said computer based on a successful integrity verification.

8. The system of claim 7, wherein said peripheral device is a read-only device.

9. The system of claim 7, wherein the peripheral device comprises one of a keyboard, a mouse, or a network device.

* * * * *